_United States Patent_ [19]

Maguire

[11] 3,792,828

[45] Feb. 19, 1974

[54] AIRCRAFT
[75] Inventor: Addison Charles Maguire, Alvaston, England
[73] Assignee: The Secretary of State for Defence, London, England
[22] Filed: Nov. 30, 1971
[21] Appl. No.: 203,300

[30] Foreign Application Priority Data
Dec. 19, 1970 Great Britain.................... 60417/70

[52] U.S. Cl............................................ 244/42 CC
[51] Int. Cl................................................ B64c 3/50
[58] Field of Search 244/42 R, 42 C, 42 CB, 42 CC, 244/42 CD, 42 CF

[56] References Cited
UNITED STATES PATENTS
3,362,659   1/1968   Razak............................ 244/42 CC
3,332,644   7/1967   Whittley........................ 244/42 CC
3,432,123   3/1969   Conway........................ 244/42.41
2,910,254   10/1959  Razak............................ 244/42 CF Primary Examiner—George E. A. Halvosa
Assistant Examiner—Sherman D. Basinger
Attorney, Agent, or Firm—Cushman, Darby & Cushman

[57] ABSTRACT

An aircraft wing main spar is utilized for the carrying of flap blowing and lift augmenting air to the trailing edge of the wing. The main spar trailing edge is formed into an elongate nozzle which directs the air over and between said flaps.

5 Claims, 3 Drawing Figures

PATENTED FEB 19 1974

AIRCRAFT

This invention concerns aircraft having STOL capabilities.

Aircraft which have flap blowing equipment are able to take off and land in distances much shorter than those required when the aircraft has no flap blowing equipment. However, known flap blowing equipment has disadvantages, chiefly by way of large aircraft weight increases due to the many feet of conduit which have to be added to and fitted in the wing structure in order to pass flap blowing fluid for the full span of the wing trailing edge flaps.

It is an object of this invention to obviate said conduit and so reduce aircraft weight.

Accordingly the present invention comprises an aircraft having wings with trailing edge flaps connected for movement relative to the wings and relative to each other, the wing including a main spar the inside of which is shaped to provide longitudinal passages parallel with said flaps, fluid compression means mounted externally of the wings and connected to pass compressed fluid to said passages for the purpose of distributing said fluid to spaces adjacent the upstream edges of said flaps for substantially the full length thereof.

Preferably the downstream edge of the wing main spar is formed into at least one longitudinal nozzle through which distribution of the fluid under pressure is effected.

The invention will now be described with reference to the accompanying drawings in which.

Figure 1:
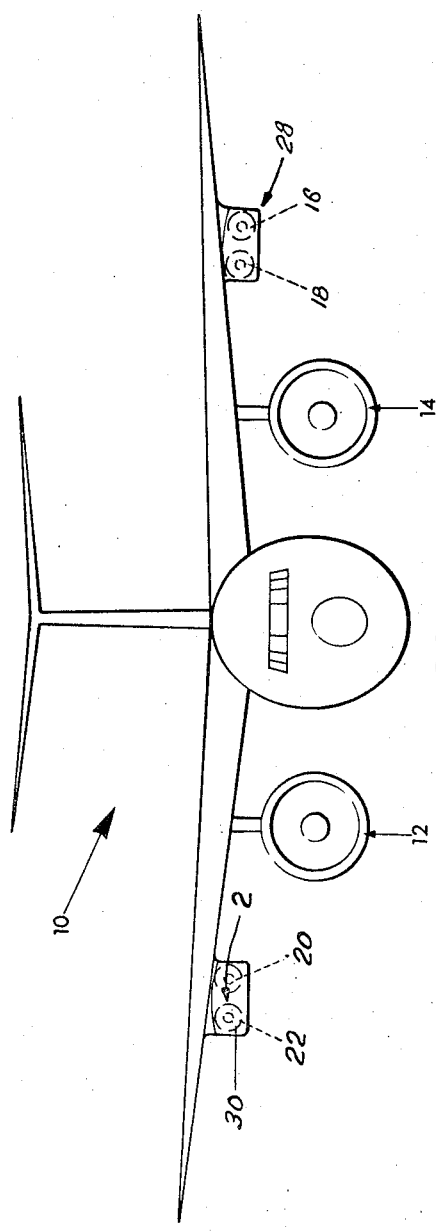
FIG. 1 is a front view of an aircraft incorporating the invention.

In FIG. 1 an aircraft 10 has two forward propulsion engines 12 and 14 and two pairs of relatively small gas turbine engines 16, 18, 20 and 22.

Figure 2:
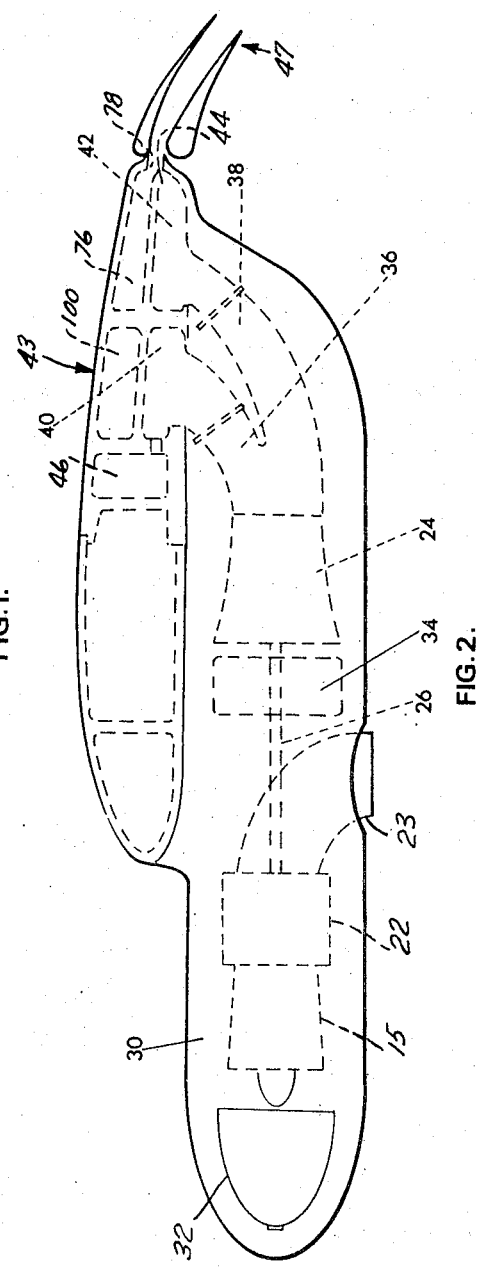
FIG. 2 is a view on arrow 2 in FIG. 1.

Each small engine, when operating, drives a respective auxiliary compressor of which only one, 24, is shown in detail in FIG. 2, the drive being achieved via shafting 26.

Each pair of small engines 16, 18, and 20, 22 are contained in respective elongate pods 28 and 30, which contain suck-in doors 32 near the upstream end to provide an air inlet to the compressors of the small engines, the compressor 15 of one smaller engine 22, being shown in dotted lines in FIG. 2. The exhaust nozzle of each small engine projects downwardly through the floor of a respective pod as indicated at 23 in FIG. 2.

Further suck-in doors 34 are provided in the pod wall structure so that when the auxiliary compressors are rotated by the small engines, the resulting pressure drop within the pods causes the doors to pivot inwards, thus enabling a flow of ambient air to pass therethrough into the auxiliary compressor intakes.

When the aircraft is landing, auxiliary engines 16, 18, and 20, 22 are switched on so as to rotate their respective auxiliary compressors which then suck in intake doors 34 and so set up a flow of ambient intake air which they compress and eject, into bifurcated ducts which will now be described with reference to FIG. 3.

Figure 3:
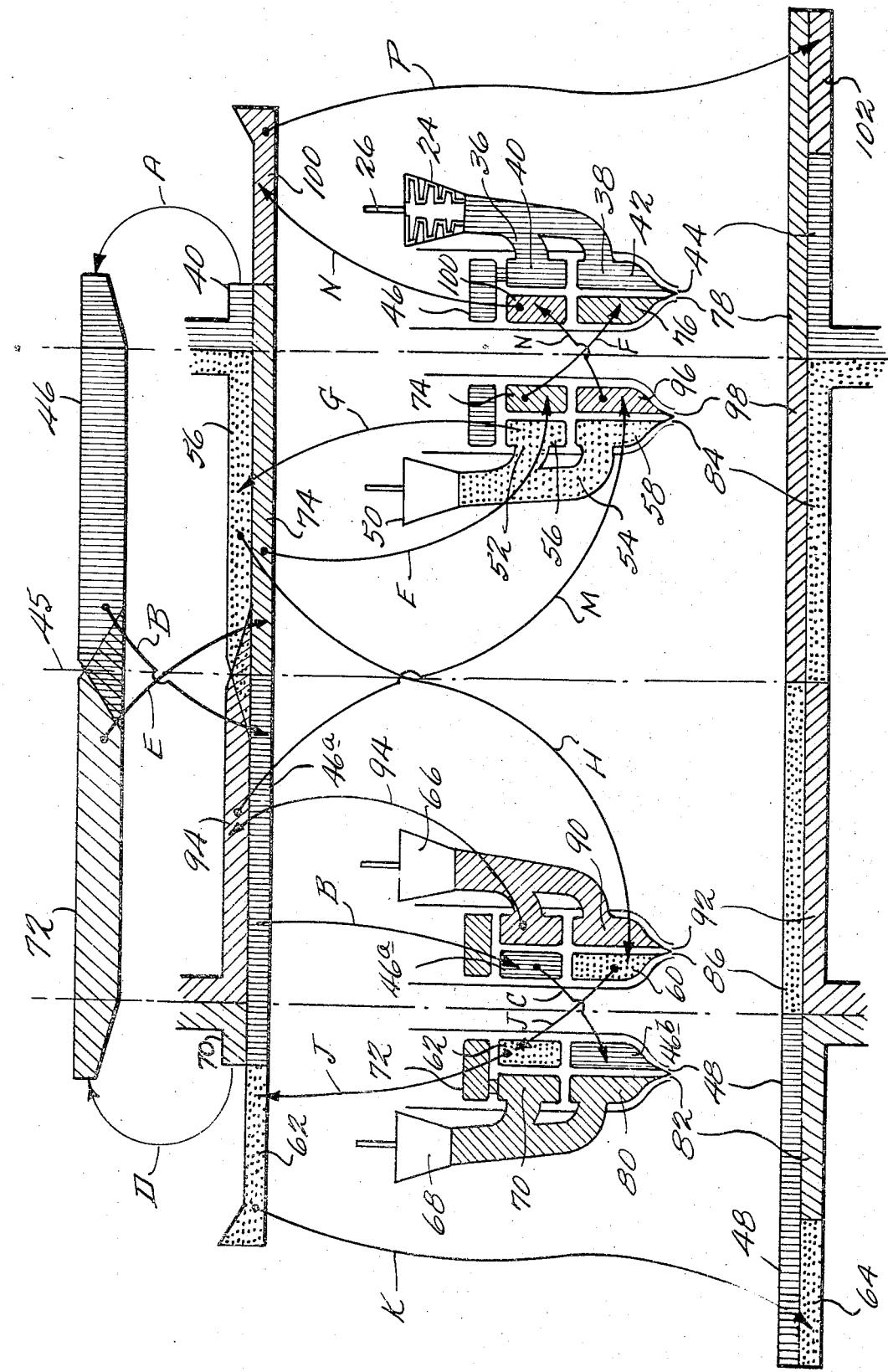
FIG. 3 is a schematic layout of the main spar ducting in accordance with the invention.

In FIG. 3 auxiliary compressor 24 on the starboard wing of an aircraft and driven by small engine 22 via shafting 26, pumps compressed air into ducts 38 and 36. The air in duct 38 passes to a chamber 42 in the main wing spar generally designated at 43 in FIG. 2 from whence it passes, via a nozzle 44, to atmosphere, nozzle 44 being elongate and ejecting on the starboard side at a position immediately upstream of the wing flaps generally designated at 47 in FIG. 2.

Duct 36 directs air via a chamber 40 in the main wing spar 43 to an elongate transfer or cross-over passage 46 (shown in plan view at the top of FIG. 3) in the direction of arrow "A". The air passes along passage 46 in the main wing spar 43 to a point 45 which represents the wing span mid point or aircraft roll axis, where it transfers across the roll axis 45 in the direction of arrow "B" to a passage 46a on the aircraft port side of the main wing spar 43, which passage is shown in plan view near the top of FIG. 3 and repeated in cross section immediately below there. The air then transfers, via a short connecting passage (arrow "C") to a chamber 46b in the main wing spar 43 from which it ejects, via a nozzle 48 on the port side to atmosphere immediately upstream of the flaps 47.

It will be seen from the foregoing description that one auxiliary compressor 24 delivers flap blowing air to both port and starboard wing flaps by the nozzles 48 and 44 respectively. Consequently, should its associated small engine 16 fail, the flap blowing facility will be removed substantially symmetrically about the aircraft's longitudinal axis 45, thus reducing tendency of the aircraft to roll.

Similarly, compressor 68, when rotated by its small engine 16 on the port side of the aircraft (not shown in FIG. 3) pumps compressed air to a transfer or cross-over passage 72, via a chamber 70 and in the direction of arrow "D", the passage 72 and the chamber 70 both being in the main wing spar 43. Again, passage 72 is shown in plan at the top of FIG. 3 and extends along the port wing to and across the roll axis 45. At the roll axis, the airflow crosses from passage 72 in the direction of arrow "E" to a starboard passage 74 shown in plan near the top of the drawing and in cross section below there. The air then flows in the direction of arrow "F" to starboard elongate chamber 76 which terminates in starboard elongate nozzle 78 immediately upstream of the wing flaps 47 on the starboard side.

Compressor 68 also pumps air to elongate chamber 80 in the wing spar 43 on the port side of the aircraft, the chamber 80 terminating in an elongate nozzle 82 immediately upstream of the wing flaps 47 on the port side. Thus, it is seen that compressor 68 pumps air to nozzles 82 and 78, both port and starboard sides respectively of the aircraft.

Auxiliary compressor 50 for small engine 20 on the starboard side of the aircraft pumps air via duct 54 to elongate chamber 58 in the main wing spar 43 which terminates in nozzle 84 immediately upstream of the wing flaps 47 on the starboard side. The compressor 50 also pumps air via duct 52 to transfer or cross over passage 56 shown in cross section and in plan (arrow "G") from which it passes in the direction of arrow "H" to the port side chamber 60 in the wing spar 43 which has elongate nozzle 86 immediately upstream of the port side wing flaps 47. Some of the air in chamber 60 also passes in the direction of arrow "J" to passage 62 on the port side of the aircraft and then in the direction of arrow "K" to port side elongate nozzle 64 immediately upstream of and at the outer end of the wing flaps 43 on the aircraft port side. The air flows from the nozzle 64 onto the flaps 47.

Auxiliary compressor 66 for small engine 18 on the port side of the aircraft pumps air into port side chamber 90 which terminates in elongate nozzle 92 immediately upstream of the wing flaps 47 on the port side of the aircraft. It also pumps air into transfer or cross-over passage 94, shown in cross section, and above the cross section in plan. Passage 94 is on the port side of the aircraft and the air flows along it to the starboard side, crossing thereto at the roll axis 45 and passing in the direction of arrow "M" to a starboard chamber 96 which terminates in an elongate nozzle 98 immediately upstream of the wing flaps 47 on the starboard side. Some of the air in chamber 96 passes in the direction of arrow "N" to starboard passage 100 from whence it flows in the direction of arrow "P" to elongate nozzle 102 at the outer end of the starboard wing. The air flows from the nozzle 102 onto the flaps 47.

The arrangement as described above ensures that if one or more small engines malfunction such that its or their associated auxiliary compressor does not operate, flap blowing air will be removed from both wings, but at the same time the remaining engine or engines will cause its or their respective compressor to provide flap blowing air on both port and starboard wings, thus maintaining the effect of asymmetric flap blowing to a minimum.

As will be noted from the above, nozzles 64, 48, 86, and 92 are all positioned on the port side of the aircraft immediately upstream of the port flaps 47 for blowing air into these flaps. Each of the nozzles is elongate and may be arranged along the span of the port wing flaps in a desired sequence. Likewise, the nozzles 102, 44, 78, 98, and 84 are all elongate nozzles for blowing air onto the flaps 47, but it will be appreciated that these nozzles are positioned on the starboard side of the roll axis 45 immediately upstream of the starboard flaps for blowing air onto these flaps. All of the passages and chambers receiving air from the ducts leading from the auxiliary compressors 24, 50, 66, and 68 are formed in the main wing spar 37 rather than by adding ducts in addition thereto, thereby eliminating weight from the overall structure. The cross-over passages 46, 56, 72, and 94 permit transfer of air from one side of the wing to the other, thus maintaining the effect of asymmetric flap blowing to a minimum. This gives the aircraft S.T.O.L. capabilities without extra conduits and intricate cross-over valve mechanisms while providing the necessary stability and reliability in action.

I claim:

1. An aircraft having a roll axis and comprising:
   a fuselage;
   a wing mounted on said fuselage and having trailing edge flaps movable relative thereto and to each other, said wing having a main spar extending across the same, said main spar having a plurality of passages therein extending along the length thereof and further having elongated nozzle means on the downstream edge thereof and upstream of said flaps, said nozzle means extending along the length of said spar for discharging air onto said flaps, said plurality of passages being discriminately connected to said nozzle means on opposite sides of said roll axis;
   forward propulsion means; and
   at least a pair of air compression means mounted externally of the wing and spaced from each other on opposite sides of the roll axis, each of said air compression means including bifurcated outlet ducts, one of said outlet ducts being connected to one of said passages which communicates with said nozzle means on one side of said roll axis and the other of said outlet ducts being connected to another of said passages which communicates with said nozzle means on an opposite side of said roll axis whereby symmetrical flap blowing is maintained regardless of whether one or both of said air compression means is operating.

2. An aircraft as claimed in claim 1 in which said elongated nozzle means includes a plurality of nozzles extending across the downstream edge of the main spar, there being at least two nozzles for each air compression means with one nozzle positioned on one side of the roll axis and the other nozzle positioned on the other side of the roll axis.

3. An aircraft as claimed in claim 2 wherein each air compression means includes at least one rotary compressor.

4. An aircraft as claimed in claim 3 including means to drive each rotary compressor, said means including a gas turbine engine having a drive shaft operatively connected to the compressor.

5. An aircraft as claimed in claim 4 wherein each of said gas turbine engines has a discharge nozzle projecting downwardly.

* * * * *